United States Patent
Yamamoto et al.

(10) Patent No.: US 12,400,474 B2
(45) Date of Patent: Aug. 26, 2025

(54) INFORMATION IDENTIFICATION PROCESSING APPARATUS, INFORMATION IDENTIFICATION PROCESSING METHOD, IMAGE IDENTIFICATION SYSTEM, AND STORAGE MEDIUM

(71) Applicant: CANON KABUSHIKI KAISHA, Tokyo (JP)

(72) Inventors: Takahisa Yamamoto, Kanagawa (JP); Hideo Noro, Tokyo (JP); Koji Makita, Kanagawa (JP); Atsuo Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 550 days.

(21) Appl. No.: 17/684,696

(22) Filed: Mar. 2, 2022

(65) Prior Publication Data
US 2022/0292874 A1 Sep. 15, 2022

(30) Foreign Application Priority Data
Mar. 12, 2021 (JP) .................. 2021-040692

(51) Int. Cl.
*G06V 40/16* (2022.01)
*G06V 10/74* (2022.01)
*G06V 10/82* (2022.01)

(52) U.S. Cl.
CPC ............ *G06V 40/168* (2022.01); *G06V 10/82* (2022.01); *G06V 40/172* (2022.01); *G06V 10/761* (2022.01)

(58) Field of Classification Search
CPC .... G06V 40/168; G06V 10/82; G06V 40/172; G06V 10/761; G06V 10/454; G06V 40/165; G06V 40/171
See application file for complete search history.

(56) References Cited

U.S. PATENT DOCUMENTS

| 9,864,902 B2 | 1/2018 | Nakano et al. |
| 9,946,645 B2 | 4/2018 | Honjo et al. |

(Continued)

FOREIGN PATENT DOCUMENTS

| JP | S63131676 A | 6/1988 | |
| JP | 10327141 A | * 12/1998 | ........... H04L 9/0662 |

(Continued)

OTHER PUBLICATIONS

"Jorge Sanchez et al., Image Classification with the Fisher Vector: Theory and Practice, 2013, Int J Comput Vis 105: 222-245" (Year: 2013).*

(Continued)

*Primary Examiner* — Chineyere Wills-Burns
*Assistant Examiner* — Phuong Hau Cai
(74) *Attorney, Agent, or Firm* — Carter, DeLuca & Farrell LLP

(57) ABSTRACT

There is provided with an information processing apparatus. An extracting unit extracts a feature vector of a subject in an image. A generating unit configured to generate, based on the feature vector, a post-conversion vector including a converted vector resulting from conversion of the feature vector using a random number, the post-conversion vector being a vector whose number of elements is determined according to the random number and is larger than a number of elements of the feature vector.

9 Claims, 11 Drawing Sheets

(56) References Cited

U.S. PATENT DOCUMENTS

| | | |
|---|---|---|
| 10,210,419 B2 | 2/2019 | Nomura et al. |
| 10,510,159 B2 | 12/2019 | Adachi et al. |
| 10,529,103 B2 | 1/2020 | Nomoto et al. |
| 10,558,851 B2 | 2/2020 | Nakano et al. |
| 10,685,490 B2 | 6/2020 | Yamasaki et al. |
| 11,095,814 B2 | 8/2021 | Makita et al. |
| 2006/0101060 A1* | 5/2006 | Li ................... G06F 16/90335 707/E17.02 |

FOREIGN PATENT DOCUMENTS

| | | |
|---|---|---|
| JP | H10327141 A | 12/1998 |
| JP | 2004-192603 A | 7/2004 |
| JP | 2006-262333 A | 9/2006 |
| JP | 5687601 B2 | 3/2015 |
| JP | 2015-139014 A | 7/2015 |
| WO | 2008/056667 A1 | 5/2008 |

OTHER PUBLICATIONS

"Kai Li et al., Image Similarity Search with Compact Data Structures, Nov. 2004, Proceedings of the Thirteenth ACM International Conference on Information and Knowledge Management, pp. 208-217" (Year: 2004).*

Notice of Reasons for Refusal issued by the Japanese Patent Office on Feb. 3, 2025 in corresponding JP Patent Application No. 2021-040692, with English translation.

* cited by examiner

INFORMATION IDENTIFICATION PROCESSING APPARATUS, INFORMATION IDENTIFICATION PROCESSING METHOD, IMAGE IDENTIFICATION SYSTEM, AND STORAGE MEDIUM

BACKGROUND OF THE INVENTION

Field of the Invention

The present invention relates to an information processing apparatus, an information processing method, an image identification system, and a storage medium.

Description of the Related Art

In recent years, there have been proposed many feature extraction techniques for extracting useful information from an object in a captured image through advanced processing. Among these techniques, a feature extraction technique for extracting a feature vector of an object in an image using a multi-layer neural network called a deep network has been studied vigorously.

Extensive research and development efforts have been made for the feature extraction technique before deep networks came to be widely known to the public. Prior to the development of the deep networks, studies have been made on a technique by which, after extracting a feature vector, the extracted feature vector is converted so as to improve the classification accuracy thereof (Japanese Patent Laid-Open No. 2004-192603). Japanese Patent No. 5687601 discloses a technique for encrypting a feature vector, since the obtained feature vector is also protected as a part of personal information in feature extraction processing performed for biometric authentication such as face authentication (personal authentication).

A technique called distillation is available in which a learned deep network model (teacher model) is used to learn a deep network (student model) having another network architecture. The student model that has been learned using the distillation technique can output a feature vector that is substantially identical to that of the teacher model.

SUMMARY OF THE INVENTION

According to one embodiment of the present invention, an information processing apparatus comprises: an extracting unit configured to extract a feature vector of a subject in an image; and a generating unit configured to generate, based on the feature vector, a post-conversion vector including a converted vector resulting from conversion of the feature vector using a random number, the post-conversion vector being a vector whose number of elements is determined according to the random number and is larger than a number of elements of the feature vector.

According to one embodiment of the present invention, an information processing apparatus comprises: an extracting unit configured to extract a feature vector of a subject in an image; a correcting unit configured to generate a corrected vector resulting from correction of a value of each of the elements of the feature vector, using a random number; and a generating unit configured to generate a post-conversion vector that is a vector resulting from inserting, at a predetermined position of the element of the corrected vector, a seed value used when generating the random number as an element.

According to one embodiment of the present invention, an information processing method comprises: extracting a feature vector of a subject in an image; and generating, based on the feature vector, a post-conversion vector including a converted vector resulting from conversion of the feature vector using a random number, the post-conversion vector being a vector whose number of elements is determined according to the random number and is larger than a number of elements of the feature vector.

According to one embodiment of the present invention, a non-transitory computer readable storage medium stores a program that, when executed by a computer, causes the computer o perform an information processing method comprising: extracting a feature vector of a subject in an image; and generating, based on the feature vector, a post-conversion vector including a converted vector resulting from conversion of the feature vector using a random number, the post-conversion vector being a vector whose number of elements is determined according to the random number and is larger than a number of elements of the feature vector.

Further features of the present invention will become apparent from the following description of exemplary embodiments (with reference to the attached drawings).

DESCRIPTION OF THE EMBODIMENTS

Figure 1:
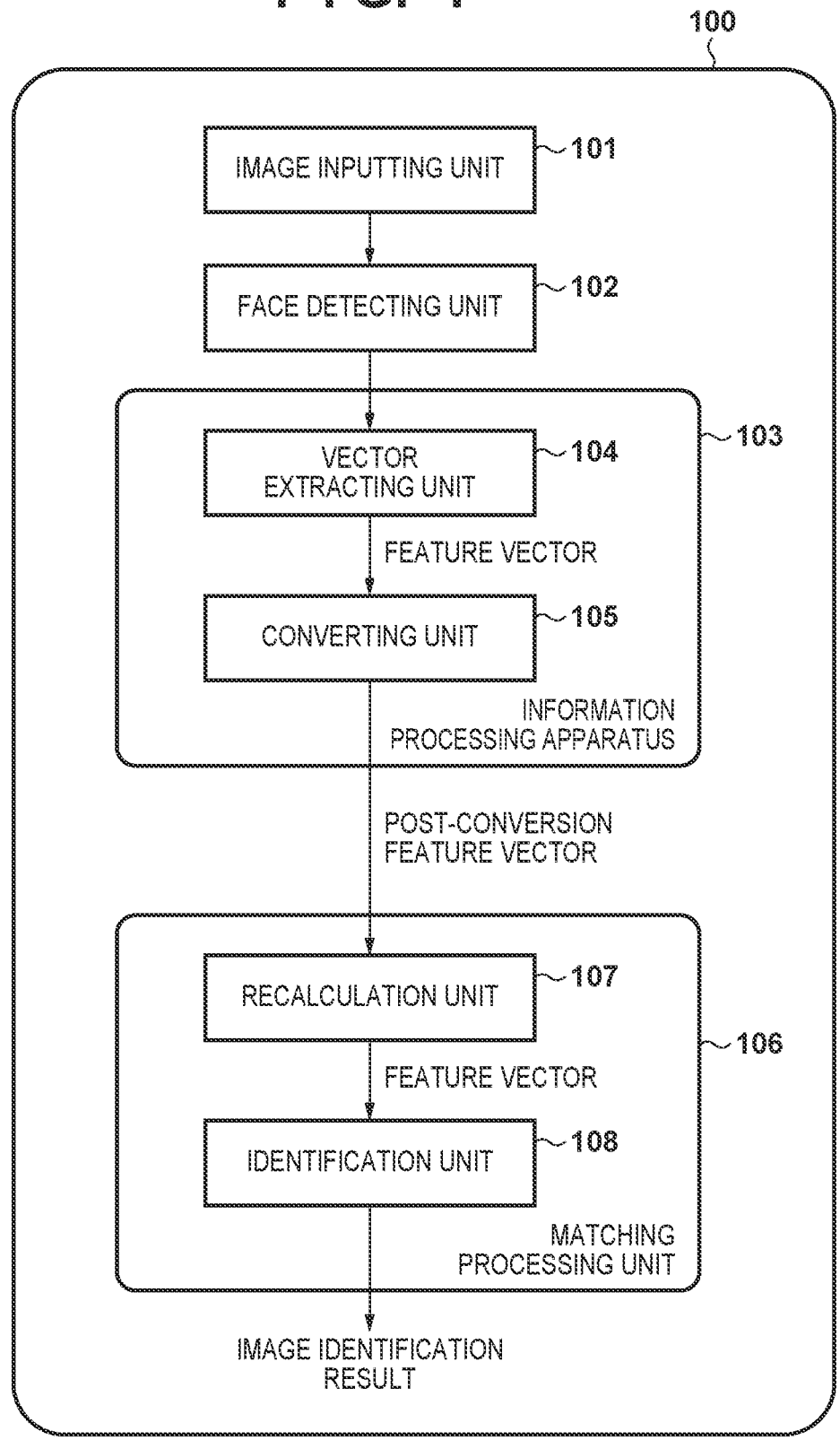
FIG. 1 is a diagram showing an example of a configuration of a system including an information processing apparatus according to a first embodiment.

However, according to the distillation technique, a large amount of labeled learning images required for normal learning are not required. Accordingly, a student model can be easily created as compared with learning of a teacher model. This is not preferable from the viewpoint of a producer who has created the teacher model at expense in time and effort. As described in relation to Japanese Patent Laid-Open No. 2004-192603 and Japanese Patent No. 5687601, it is possible to perform some kind of conversion processing on the extracted feature vector. However, this is not a valid measure to prevent distillation because distillation can be performed using the converted feature vector as teaching data.

In an embodiment of the present invention, a feature vector is extracted from a subject in an image so as to make it difficult to create a student model using a distillation technique.

Hereinafter, embodiments will be described in detail with reference to the attached drawings. Note that the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Distillation

The distillation technique is a technique that allows a student model having a lighter weight to be generated from a teacher model. While distillation is a useful technique, abusing this technique may allow an approximate copy of the teacher model to be easily created. An example of a method for preventing a student model from being created through distillation is a method in which only a result of classification is output from a classifier configured to output a result of classification from an image, without a feature vector being output.

However, depending on the application that performs feature extraction, it may be difficult to not to output a feature vector. For example, for an identifier configured to perform face authentication, it is not realistic to classify all mankind (individuals). Accordingly, in many cases, determination is made as to whether or not two faces belong to the same person. With such an identifier, a result of determining as to whether or not two faces belong to the same person can be output by calculating the distance (or similarity) between feature vectors respectively calculated from the two faces. Here, when a feature vector is to be output, a feature vector calculated from an image (one face) may be registered for shared use. However, when only a result of the determination is to be output, it is always necessary to input two images, resulting in a reduction in usability.

First Embodiment

An information processing apparatus according to the present embodiment extracts a feature vector from a subject in an image, and converts the extracted feature vector such that the number of dimensions (number of elements) of the extracted feature vector has a (inconstant) value according to a random number. As a result, the number of elements of the feature vector is prevented from being uniquely determined, so that the network architecture of the student model cannot be determined, which makes it impossible to apply a distillation technique.

FIG. 1 is a block diagram showing an example of a configuration of an image identification system that performs face authentication, and that includes a feature extracting unit 103 of the information processing apparatus according to the present embodiment. The system 100 includes an image inputting unit 101, a face detecting unit 102, a feature extracting unit 103, and a matching processing unit 106. Although the system 100 according to the present embodiment will be described below as being a system that performs face authentication, the system 100 may perform any detection processing for extracting, from a subject in an image, a feature vector to be used for determination, including, for example, authentication of a part other than the face (e.g., another part of a human body), and class determination, without any particular limitation.

The image inputting unit 101 obtains image data that is to be subjected to face authentication. The image inputting unit 101 may obtain an image captured by an image capturing unit (not shown) as the image data, or may obtain image data via a network or from a storage such as a storage medium 1203, which will be described later. The image inputting unit 101 may be included inside the information processing apparatus including the face detecting unit 102, or may be included in an apparatus separate from the information processing apparatus, and be configured to transmit the image data to the face detecting unit 102 via a network.

The face detecting unit 102 detects a face from the image data obtained by the image inputting unit 101, and generates a face region image. The face detecting unit 102 may detect a face by a known face detection technique, and there is no particular limitation on the technique. For example, the face detecting unit 102 may extract the shape of a constituent element of the face region in the image, such as an eye, a mouth, or a nose, estimate the size of the face based on the size of both eyes and the distance therebetween, and may determine, as the face region, a region surrounded by a box having the size of the face estimated with respect to the center of the nose as a reference. Alternatively, the face detecting unit 102 may detect a face by a face detection technique using a hierarchical neural network. The face detecting unit 102 transmits the image data of the detected face region to a vector extracting unit 104 of the feature extracting unit 103 as a face region image that has been normalized in a certain size by a predetermined technique.

The feature extracting unit 103 includes a vector extracting unit 104 that extracts information (feature vector) for identifying an individual from the image, and a converting unit 105 that performs predetermined conversion on the feature vector. The vector extracting unit 104 according to the present embodiment outputs the feature vector from the detected facial image obtained from the face detecting unit 102, and the detailed description of the processing performed here will be described later with reference to FIG. 2.

The converting unit 105 according to the present embodiment converts, using a random number, the feature vector output from the vector extracting unit 104, and generates a post-conversion vector having a larger number of dimensions than that of the feature amount before conversion. This conversion is performed in order to prevent a (functional) duplication of the feature extracting unit 103 from being created by a distillation technique. The processing performed by the converting unit 105 will be described later with reference to FIG. 3.

Figure 2:
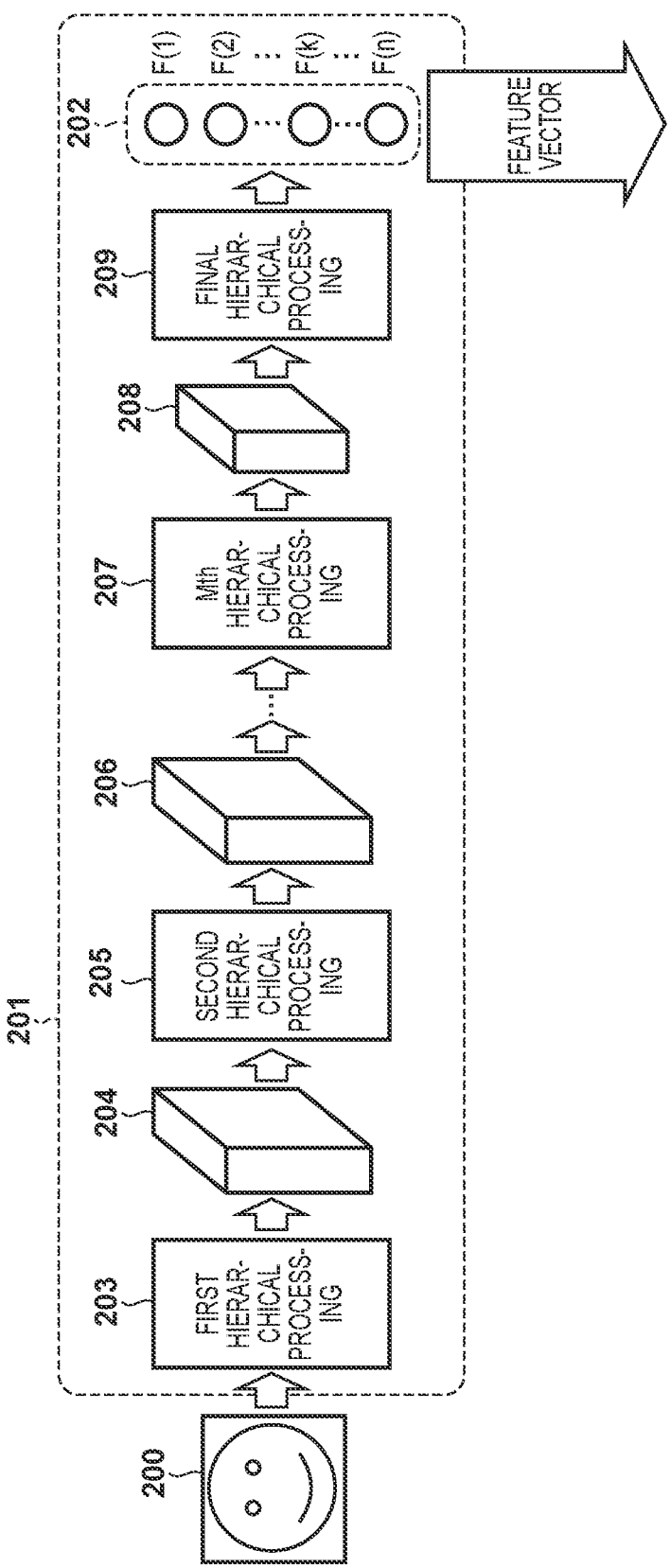
FIG. 2 is a schematic diagram for illustrating feature vector extraction according to the first embodiment.

FIG. 2 is a schematic diagram for illustrating the processing, performed by the vector extracting unit 104, for extracting a feature vector from the face region image. An image 200 is a face region image that has been generated by the face detecting unit 102, and been normalized to a certain size. Here, the vector extracting unit 104 extracts a feature vector using a Convolutional Neural Network (CNN), which is a kind of deep network. With a CNN, processing composed of convolutional processing, nonlinear processing, and pooling processing is repeatedly performed on an input image, whereby abstracted information is extracted from the input image. In the present embodiment, one unit of the above-described repeated processing is referred to as a layer, and, on an output of this layer, the processing of the next layer is performed. Although a Rectified Linear Unit (ReLU) is used, for example, here as the nonlinear processing processing within a layer, another known technique may be used. Although Max Pooling (Max Pooling) is used as the pooling processing, another known technique may be used.

The CNN of the vector extracting unit 104 has been learned in advance so as to allow information for identifying each individual to be extracted from a facial image. Here, learning means adjusting a large amount of parameters necessary for processing the CNN of the vector extracting unit 104. That is, the large amount of parameters constituting the vector extracting unit 104 have been adjusted through learning so as to extract information for identifying each individual from an input image. This learning may be a learning in which, for example, a loss function using softmax is stopped, and the parameters of the CNN are adjusted through backpropagation such that the value of the loss function is reduced. Alternatively, a different known learning method may be used.

In the present embodiment, the vector extracting unit 104 extracts a feature vector from the face region image. The feature vector (feature amount) is information for identifying an individual in an image, and has the extracted value as each of the elements of the vector.

In processing 203, the vector extracting unit 104 performs one layer of the above-described processing on the image 200, and outputs an intermediate map 204. The intermediate map 204 is used as an input to processing 205. In the processing 205, the vector extracting unit 104 performs one layer of the above-described processing on the intermediate map, and outputs an intermediate map 206. The vector extracting unit 104 repeats such hierarchical processing on an output of hierarchical processing. In later subsequent processing 207, the vector extracting unit 104 performs convolutional processing on the output of the repeated hierarchical processing, and outputs a final intermediate map 208.

In processing 209, the vector extracting unit 104 performs fully connected operation processing on the final intermediate map 208, and outputs a feature vector 202. The following description will be given assuming that the feature vector 202 is the value of a vector having n elements. In fully connected operation processing, operation processing for multiplying a matrix (referred to as a fully connected matrix) with the final intermediate map 208, whereby a feature vector 202 is calculated. The parameter of the fully connected matrix is given by "the number of all data pieces input to the processing 207"×"the number of elements of the feature vector". Note that the vector extracting unit 104 may output the feature vector 202 by performing connection on the final intermediate map using Global Average Pooling (GAP), or may select a desired method based on the design principle of the network architecture.

Figure 3:
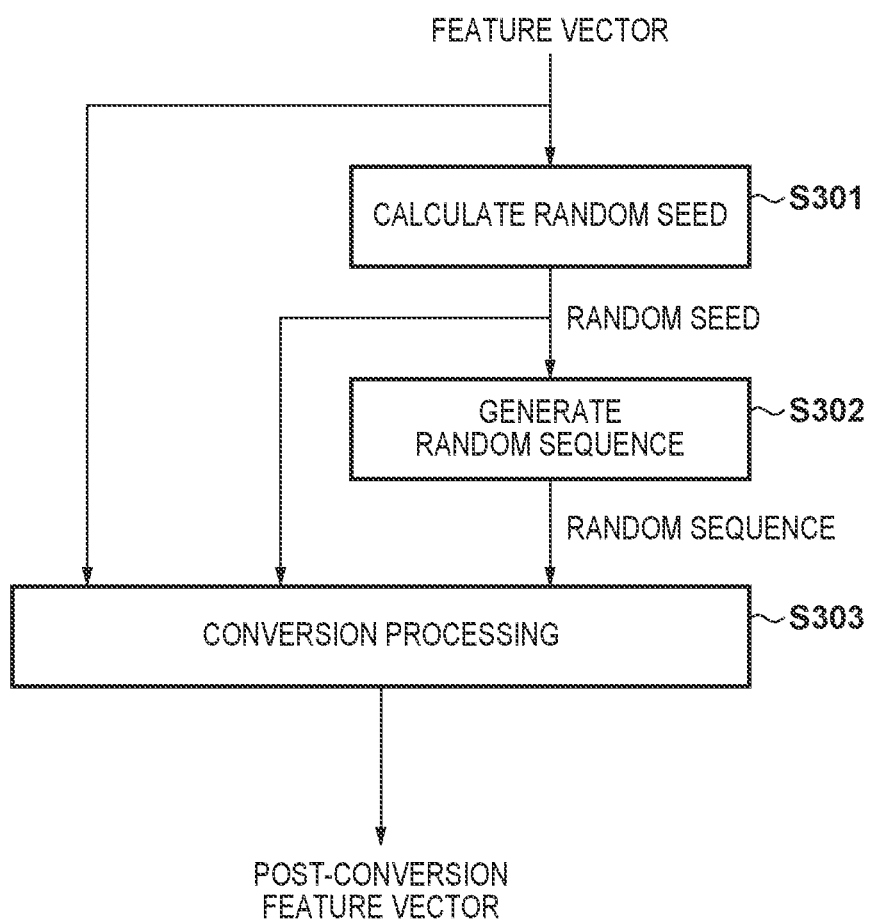
FIG. 3 is a flowchart illustrating an example of conversion processing according to an information processing method according to the first embodiment.

FIG. 3 is a flowchart illustrating an example of the processing performed by the converting unit 105. The processing illustrated in FIG. 3 is performed when the feature vector from the vector extracting unit 104 is input to the converting unit 105. In step S301, the converting unit 105 calculates a seed value for generating a random number used when converting a feature vector, based on the feature vector. The method for calculating the seed value here is not particularly limited as long as the generated random value may be determined to be constant. For example, the converting unit 105 may use a part of the feature vector as a seed value, or may be used the sum of the values of elements of the feature vector as a seed value. The seed value may be generated each time processing is performed, or may be selected from a group of random numbers generated in advance.

In step S302, the converting unit 105 generates a random number based on the seed value calculated in step S301. This random number is a converted vector having a larger number of elements than that of the feature vector, and the number of elements thereof is determined according to the seed value. In the following, the random number is referred to as a random sequence, and the number of elements thereof is referred to as a random sequence length (here, r). As the method for generating the random sequence, a linear congruential method or an M series can be used, for example. However, any operation processing or selection processing may be performed as long as the random sequence having a random sequence length according to the seed value is generated as described above. For example, in the case of using a linear congruential method, the converting unit 105 can generate a random sequence having a random sequence length having a value resulting from adding the value of the random number generated from the seed value to the number of elements (here, n) of the feature vector.

In step S303, the converting unit 105 uses the feature vector and the random sequence to generate a post-conversion vector that is a feature amount output from the information processing apparatus according to the present embodiment. In the present embodiment, the converting unit 105 generates an updated vector resulting from updating the value of each of the elements of the random sequence based on the value of the positionally corresponding element of the feature vector. Then, the converting unit 105 inserts the seed value at a predetermined position of the elements of the updated vector as an element, thereby generating a post-conversion vector (i.e., the number of elements of the post-conversion vector is equal to a number resulting from adding 1 to the number of elements of the random sequence). Here, the updated vector is generated through linear conversion or nonlinear conversion using the feature vector and the random sequence. However, the generation method thereof is not particularly limited. The converting unit 105 may create the updated vector, for example, by adding the corresponding elements, or multiplying the corresponding elements (an element that does not have the corresponding element is not updated). The following description will be given assuming that the updated vector is generated by adding the elements.

Figure 4:
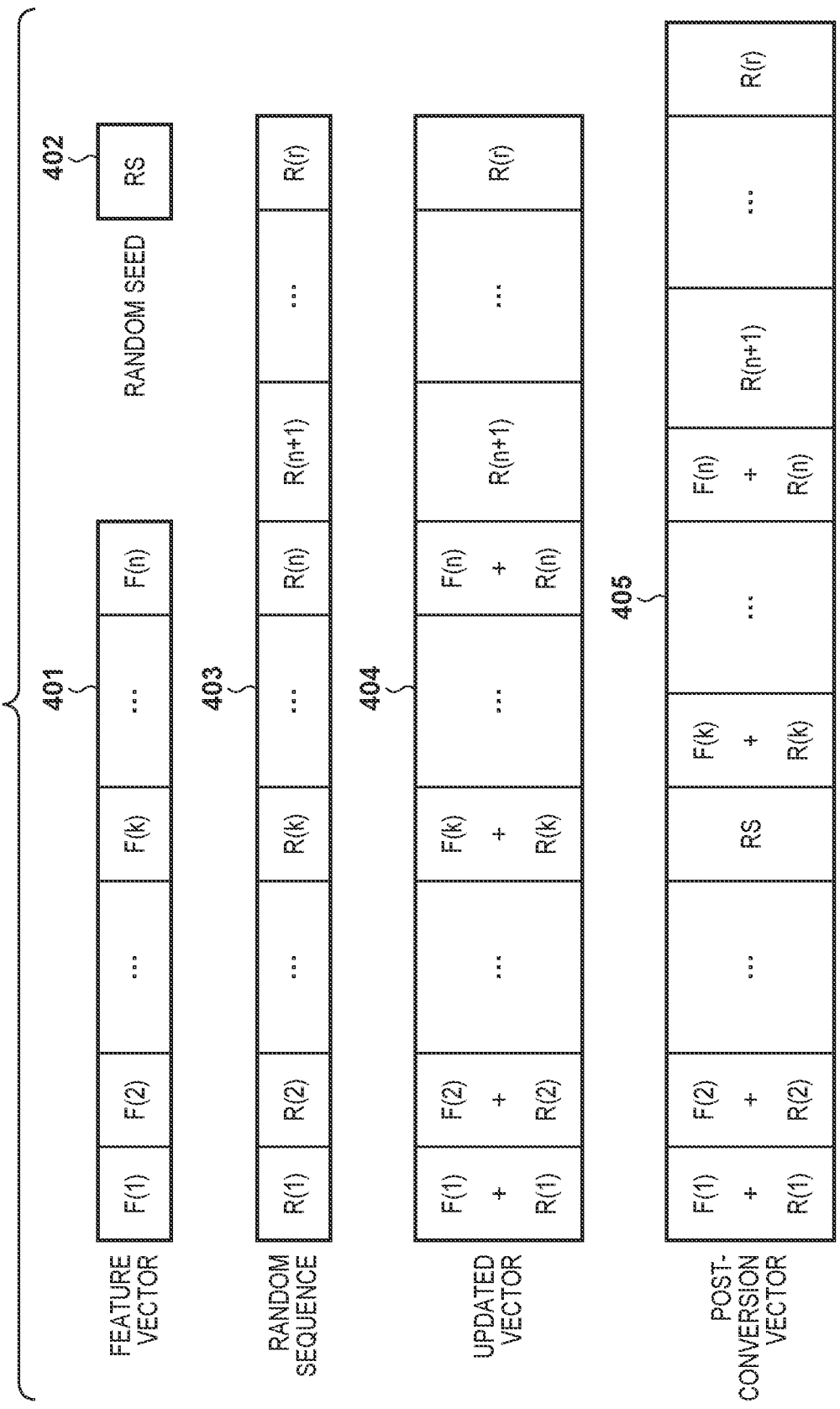
FIG. 4 is a diagram showing examples of vectors generated by the conversion processing according to the first embodiment.

FIG. 4 is a schematic diagram for illustrating the processing performed in step S303. A vector 401 is a feature vector, and includes F(1) to F(n) as n elements. A random seed 402 is a seed value, which is assumed to be RS here. A vector 403 is a random sequence generated based on the random seed 402, and includes R(1) to R(r) as r elements.

A vector 404 is an updated vector, which is assumed to be generated by adding the corresponding elements of the feature vector and the random sequence, here. That is, here, since r>n, the vector 404 includes, as the r elements, F(1)+R(1) to F(n)+R(n) as elements up to the nth element, and R(n+1) to R(r) as the n+1th to Rth elements.

A vector 405 is a post-conversion vector generated by inserting the seed value at a predetermined position of the element of the updated vector. The position at which the seed value of the post-conversion vector is inserted is not particularly limited as long as the position can be referred to during seed value extraction processing (the processing performed in step S501 described below) performed by an identifier at a later time. Here, it is assumed that the seed value RS is inserted at the kth position ($0 \leq k \leq n$).

With such a configuration, a feature vector extracted from a subject in an image can be converted using a random number, and a post-conversion vector having a number of elements that is larger than that of the feature vector before conversion and is inconstant can be generated. Accordingly, a student model that outputs a feature vector that is substantially the same as a feature vector (post-conversion vector) calculated by the information processing apparatus according to the present embodiment is difficult to be created by a distillation technique. The reason being that it is difficult, through distillation, to create a model that calculates a feature vector having an inconstant number of elements through final hierarchical processing such as the processing 209 illustrated in FIG. 2. That is, in the case where full-connection processing is performed in the processing 209 when calculating a post-conversion vector, the size of the above-described fully connected matrix cannot be determined. In the case where GAP is performed in the processing 209, the number of feature planes of the final intermediate map 208 that is to be subjected to GAP is equal to the number of elements of the feature vector 202 that is output. However, if the number of elements of the feature vector is inconstant, the number of feature planes of the final intermediate map 208 cannot be determined.

Next, a description will be given of a determining unit, i.e., the matching processing unit 106 shown in FIG. 1, that uses post-conversion vectors respectively generated from two face region images to determine whether or not the two face region images belong to the same person. The matching processing unit 106 includes a recalculation unit 107 and an identification unit 108.

Figure 5:
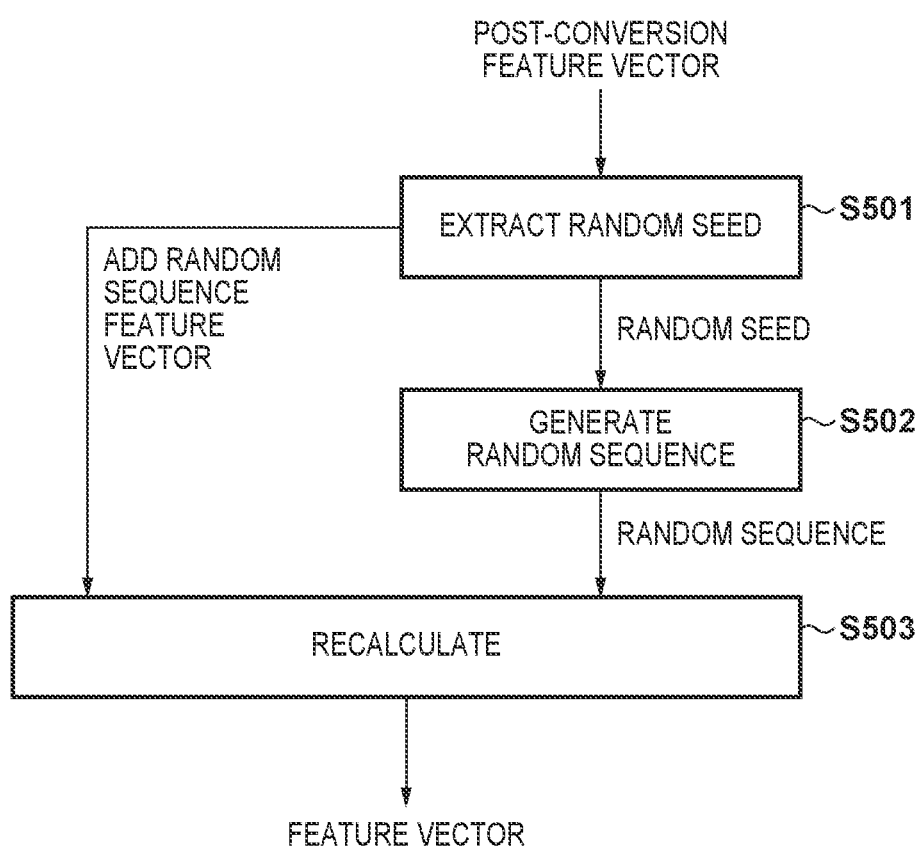
FIG. 5 is a flowchart illustrating an example of feature vector recalculation processing according to the first embodiment.

The recalculation unit 107 recalculates a feature vector, using the post-conversion vector generated by the converting unit 105 as an input. Basically, the recalculation unit 107 according to the present embodiment performs the processing steps performed by the converting unit 105 in the reverse order. FIG. 5 is a flowchart illustrating an example of the processing performed by the recalculation unit 107, and the recalculation unit 107 will be described with reference to FIG. 4 as well.

In step S501, the recalculation unit 107 extracts the seed value from the post-conversion vector. Here, the recalculation unit 107 extracts a random seed 402 that is the kth element of the post-conversion vector 405, and regenerates an updated vector 404.

In step S502, the recalculation unit 107 generates, based on the extracted seed value, a random number in the same manner as in the processing in step S302. That is, the recalculation unit 107 generates a random sequence 403 based on the random seed 402.

In step S503, the recalculation unit 107 recalculates a feature vector based on the updated vector 404 regenerated in step S501, and the random sequence 403 generated in step S502. Here, the recalculation unit 107 recalculates a vector identical to the feature vector 401 by subtracting, from the value of each of the elements of the updated vector 404, the value of the corresponding element of the random sequence, and extracting the first to nth elements. Through such processing, the feature vector extracted by the vector extracting unit 104 can be recalculated based on the post-conversion vector.

The identification unit 108 uses two feature vectors recalculated by the recalculation unit 107 to determine whether or not facial images (here, a facial image p and a facial image q) from which the respective feature vectors have been extracted belong to the same person. That is, the identification unit 108 performs the above-described determination using feature vectors, which are post-conversion vectors that have been generated respectively using the facial image p and the facial image q as inputs and then have been restored into feature vectors by the recalculation unit 107.

Here, the identification unit 108 calculates a cosine similarity based on the facial image p and the facial image q. If the calculated cosine similarity is greater than a predetermined threshold, it is determined that that the facial images belong to the same person, and if not, it is determined that the facial images do not belong to the same person. Note that the determination processing performed by the identification unit 108 may be performed by any general identification processing method using a feature vector.

With such a configuration, based on a post-conversion vector converted using a random number, a feature vector extracted from a subject in an image used when generating the post-conversion vector can be recalculated. Then, based on the recalculated feature vector, whether or not the subjects in the images belong to the same person can be determined. Accordingly, whether or not the subjects in the images belong to the same person can be determined using a post-conversion vector that is an output that makes it difficult to create a student model through a distillation technique.

Second Embodiment

Deep networks are known to provide a technique that excels in feature extraction, and allow information for identifying each individual to be extracted from a facial image through learning. Accordingly, a feature vector calculated from a facial image of a person using a deep network can be considered as information representing the individuality of the person, and it can be expected that slightly varied facial images of the same person have a substantially identical feature vector.

Here, a model used in distillation as the student model is also a deep network (although different in network architecture from the teacher model). Between the teacher model and the student model in distillation, feature vectors that can be extracted from facial images of the same person are substantially identical. That is, from the viewpoint that whether or not two facial images belong to the same person is determined according to the distance between feature vectors extracted from the two facial images, the results of calculation of the distance between these feature vectors are also substantially identical between the teacher model and the student model.

The information processing apparatus according to a second embodiment extracts a feature vector from a subject in an image, and corrects each of the elements of the extracted feature vector based on a random number. Then, a seed value of the random number used for correction is inserted at a predetermined position of the corrected element of the feature vector, thereby generating a post-conversion vector. As a result, the elements of the feature vector are randomly converted according to the random number, so that the correlation in distance between the vectors becomes weaker before and after the conversion. That is, even when two facial images of the same person that resemble each other closely are input, post-conversion vectors resulting from the feature vectors respectively extracted from the facial images do not resemble each other at all. In such a case, it is unlikely that an appropriate student model can be generated by performing learning through distillation using a feature vector (post-conversion vector) calculated by the teacher model as teaching data. This can be expected to contribute to prevention of duplication through distillation. Note that the information processing apparatus according to the present embodiment can restore the post-conversion vector into the original feature vector by referring to the seed value of the random number used for correction, and thus does not compromise the function of the identifier.

Figure 6:
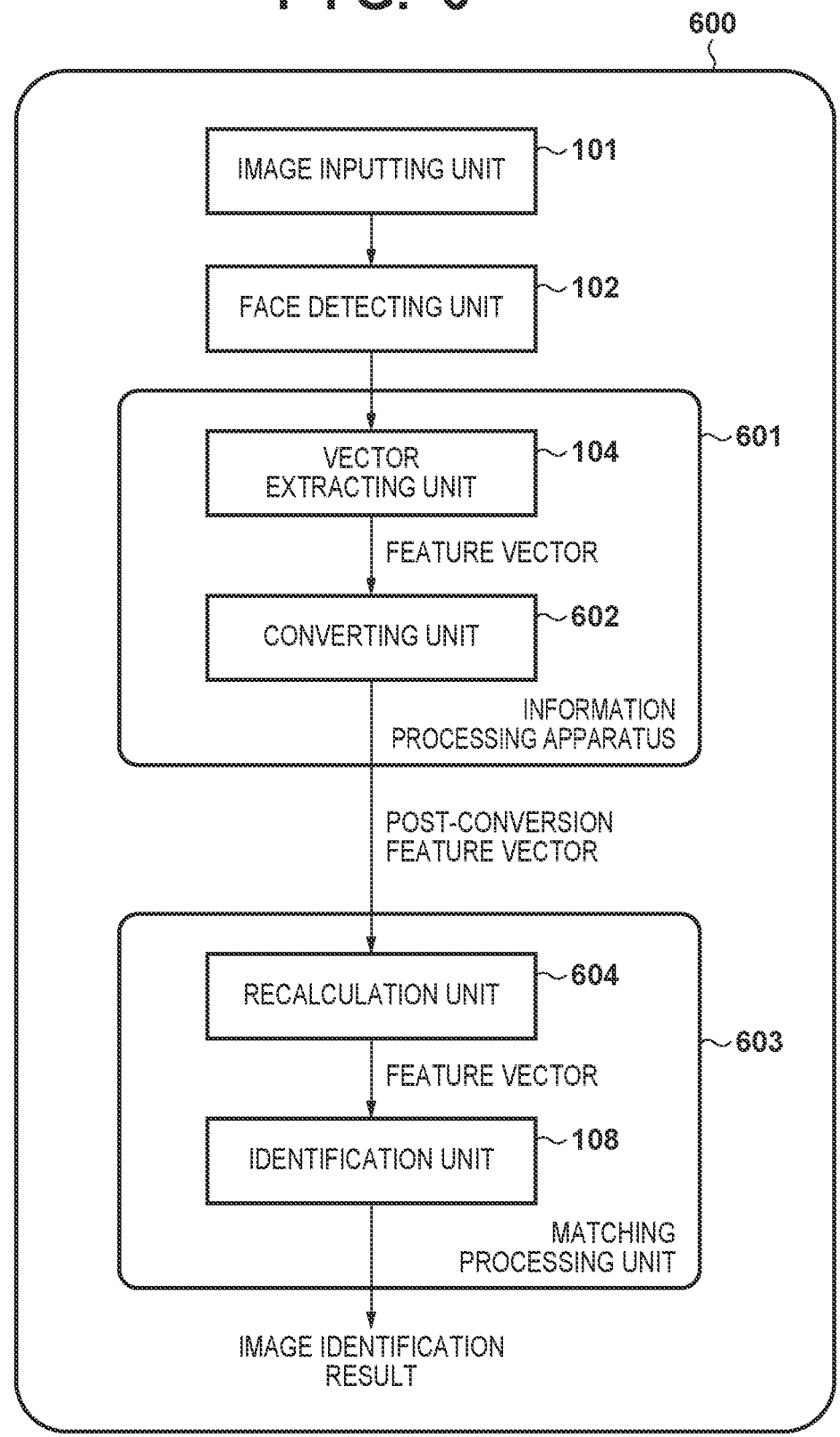
FIG. 6 a diagram showing an example of a configuration of a system including an information processing apparatus according to a second embodiment.

The information processing apparatus according to the present embodiment performs processing for extracting a feature vector using a deep network basically in the same manner as in the information processing apparatus according to the first embodiment. FIG. 6 is a block diagram showing a functional configuration of a system 600 including a feature extracting unit 601 of the information processing apparatus according to the present embodiment. The system 600 has the same configuration as that of the system 100 except for including a feature extracting unit 601 (converting unit 602) in place of the feature extracting unit 103 (and the converting unit 105 thereinside), and a matching processing unit 603 (recalculation unit 604) in place of the matching processing unit 106 (the recalculation unit 107). Accordingly, redundant descriptions have been omitted.

The feature extracting unit 601 includes a vector extracting unit 104 and a converting unit 602. The converting unit 602 performs, based on a random number, conversion using predetermined conversion processing on each of the elements of the feature vector extracted from the face region image by the vector extracting unit 104. That is, the converting unit 602 corrects each of the elements of the extracted feature vector based on a random number, and inserts, at a predetermined position of the corrected element of the feature vector, a seed value of the random number used for the correction, thereby generating a post-conversion vector.

Figure 7:
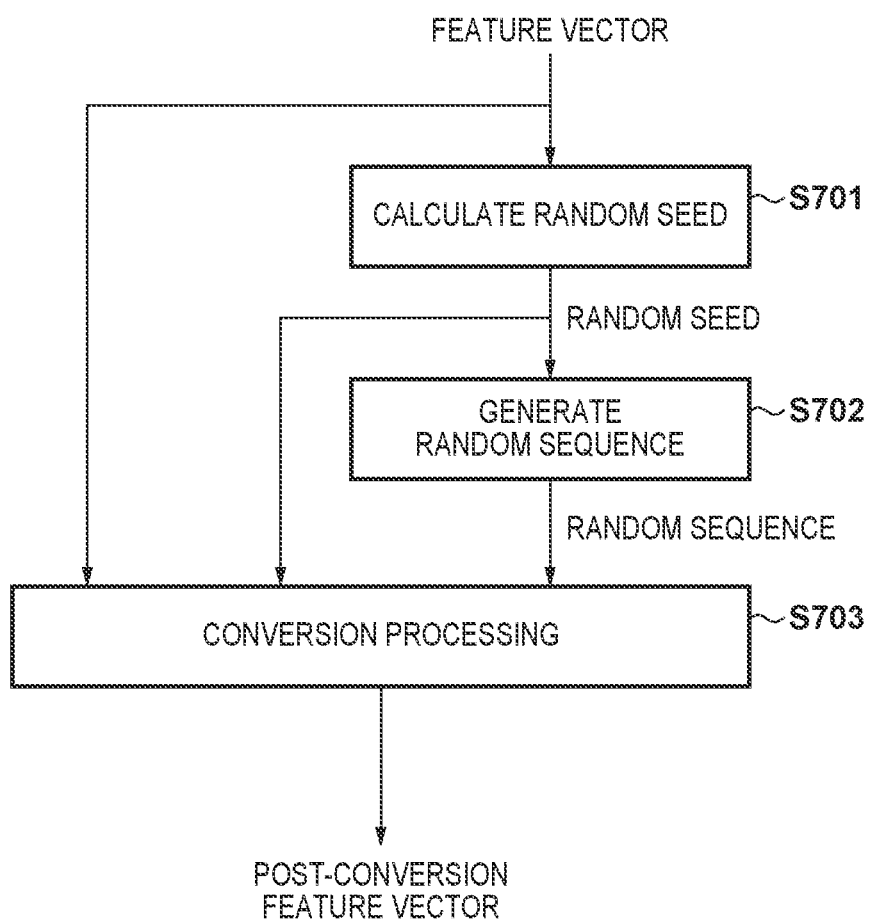
FIG. 7 is a flowchart illustrating an example of conversion processing according to an information processing method according to the second embodiment.

FIG. 7 is a flowchart illustrating an example of the processing performed by the converting unit 602. The processing illustrated in FIG. 7 is performed in the same manner as in the processing illustrated in FIG. 3 except that the number of elements of the random sequence matches the number of elements of the feature vector (the random sequence is generated such that r=n is satisfied). That is, in step S701, the converting unit 602 calculates a seed value for generating the random number used when converting the feature vector, based on the feature vector. As in the case of the processing in step S301, the method for calculating the seed value here is not particularly limited as long as the generated random value is determined to be constant.

In step S702, the converting unit 602 generates a random number based on the seed value calculated in step S701. As described above, here, a random sequence that is a vector having a number of elements equal to the number of elements of the feature vector is generated based on the seed value.

In step S703, the converting unit 602 generates a post-conversion vector using the feature vector and the random sequence generated in step S702. The converting unit 602 generates the post-conversion vector in the same manner as in the generation processing in step S303 of the first embodiment except that the numbers of elements of the feature vector and the random sequence are equal. That is, in the present embodiment, the converting unit 602 generates a corrected vector (updated vector) by adding the corresponding elements of the feature vector and the random sequence, and generates a post-conversion vector by inserting a seed value at a predetermined position of the element of the corrected vector as an element.

Figure 8:
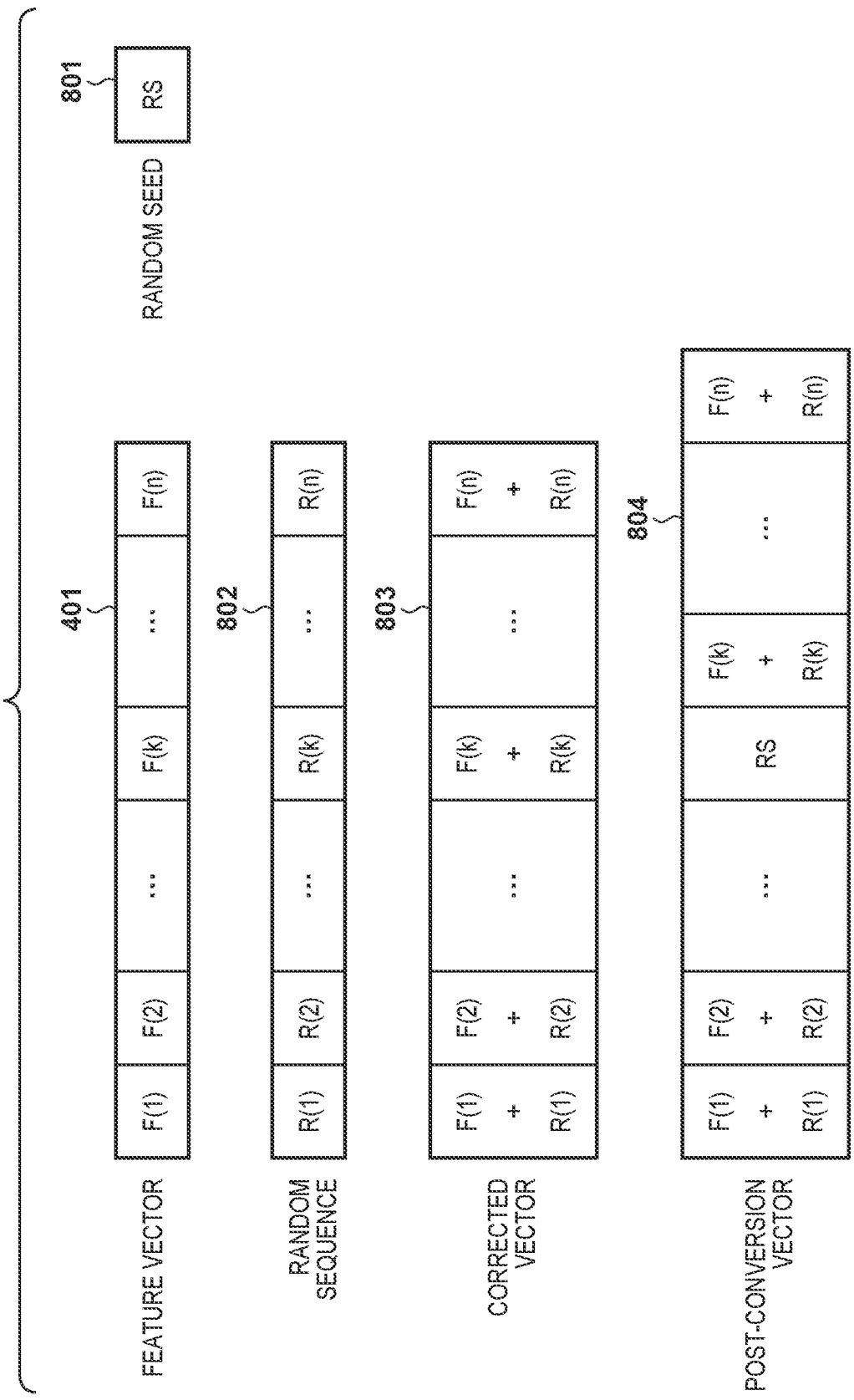
FIG. 8 is a diagram showing examples of vectors generated by the conversion processing according to the second embodiment.

FIG. 8 is a schematic diagram for illustrating the processing in step S703. A vector 401 is a feature vector, and includes F(1) to F(n) as n elements. A random seed 801 is a seed value, which is assumed to be RS here. A vector 802 is a random sequence generated based on the random seed 801, and includes R(1) to R(n) as n elements.

A vector 803 is a corrected vector, and has values resulting from adding adding an element of the feature vector 401 and the corresponding element of the random sequence 802 for each element. A vector 804 is a post-conversion vector generated by inserting the random seed 801 at a predetermined position of the element of the corrected vector 803. As in the case of the insertion position of the seed value 402 in the first embodiment, the predetermined position at which the random seed 801 is inserted is not limited, but is also assumed to be the kth position in the present embodiment.

With such a configuration, each of the elements of the feature vector extracted from a subject in an image is corrected based on a random number, and a seed value of the random number used for correction is inserted at a predetermined position of the corrected element of the feature vector, thereby generating a post-conversion vector. Accordingly, the elements of the feature vector are randomly converted according to the random number, so that the correlation in distance between the vectors becomes weaker before and after the conversion, thus making it difficult to create a student model using a distillation technique.

Next, a description will be given of a determining unit, i.e., the matching processing unit 603 shown in FIG. 6, that uses post-conversion vectors respectively generated from two face region images to determine whether or not the two face region images belong to the same person. The matching processing unit 603 includes a recalculation unit 604 and an identification unit 108.

Figure 9:
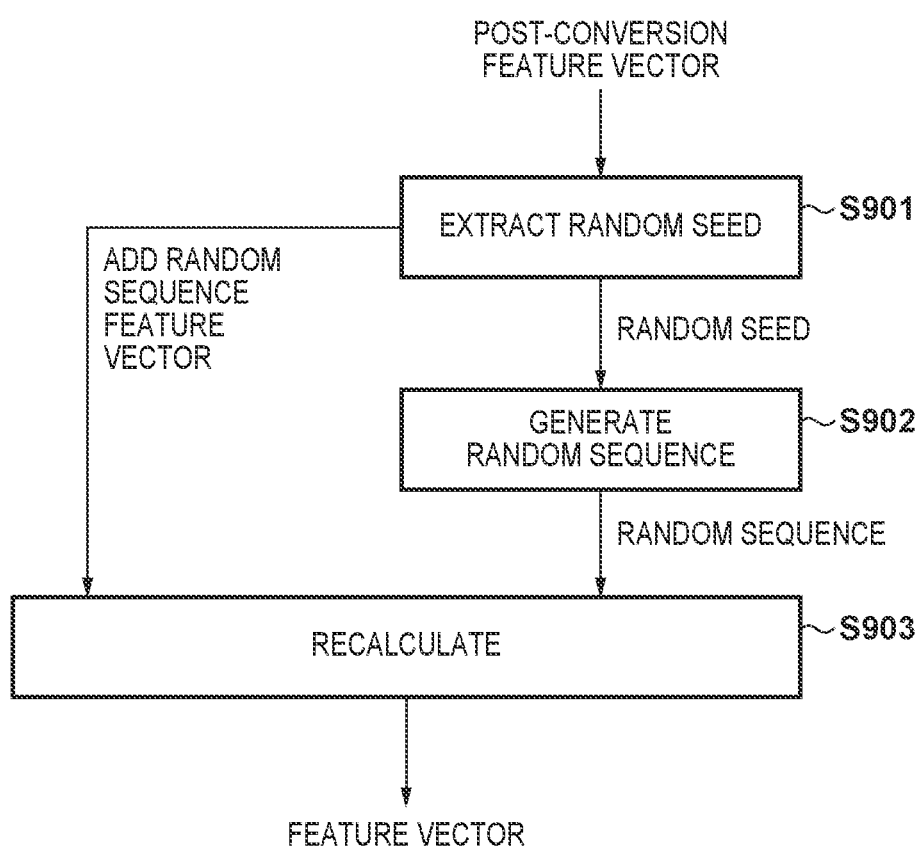
FIG. 9 is a flowchart illustrating an example of feature vector recalculation processing according to the second embodiment.

The recalculation unit 604 recalculates a feature vector, using the post-conversion vector generated by the converting unit 602 as an input. Basically, the recalculation unit 604 according to the present embodiment performs the processing steps performed by the converting unit 602 in the reverse order. FIG. 9 is a flowchart illustrating an example of the processing performed by the recalculation unit 604, and the recalculation unit 604 will be described with reference to FIG. 8 as well.

In step S901, the recalculation unit 604 extracts the seed value from the post-conversion vector. Here, the recalculation unit 604 extracts a random seed 801 that is the kth element of the post-conversion vector 804, and regenerates a corrected vector 803.

In step S902, the recalculation unit 604 generates, based on the extracted seed value, a random number in the same manner as in the processing in step S702. That is, the recalculation unit 604 generates a random sequence 802 based on the random seed 801.

In step S903, the recalculation unit 604 recalculates a feature vector based on the corrected vector 803 regenerated in step S901, and the random sequence 802 generated in step S902. Here, the recalculation unit 604 recalculates a vector identical to the feature vector 401 by subtracting, from the value of each of the elements of the corrected vector 803, the value of the corresponding element of the random sequence. Through such processing, the feature vector extracted by the vector extracting unit 104 can be recalculated based on the post-conversion vector.

As in the case of the first embodiment, the identification unit 108 uses two feature vectors recalculated by the recalculation unit 604 to determine whether or not facial images from which the respective feature vectors have been extracted belong to the same person.

With such a configuration, based on a post-conversion vector converted using a random number, a feature vector extracted from a subject in an image used when generating the post-conversion vector can be recalculated. Then, based on the recalculated feature vector, whether or not the subjects in the images belong to the same person can be determined. Here, a post-conversion vector is obtained by adding the feature vector and the random sequence for each element (and further inserting a seed value). Although each of the elements of the random sequence is randomly determined based on the seed value, each of the elements of the post-conversion vector obtained by adding the elements of the random sequence also inherits the properties of the random sequence to some extent (each of the elements of the post-conversion vector is also randomly determined), and the randomness is also reflected in the distance between the feature vectors. Accordingly, it is difficult to distinguish between face region images by directly using post-conversion vectors, so that it is also difficult to create a student model using a distillation technique. On the other hand, with the matching processing unit 603 according to the present embodiment, whether or not subjects in images belong to the same person can be determined using such post-conversion vectors.

Figure 11:
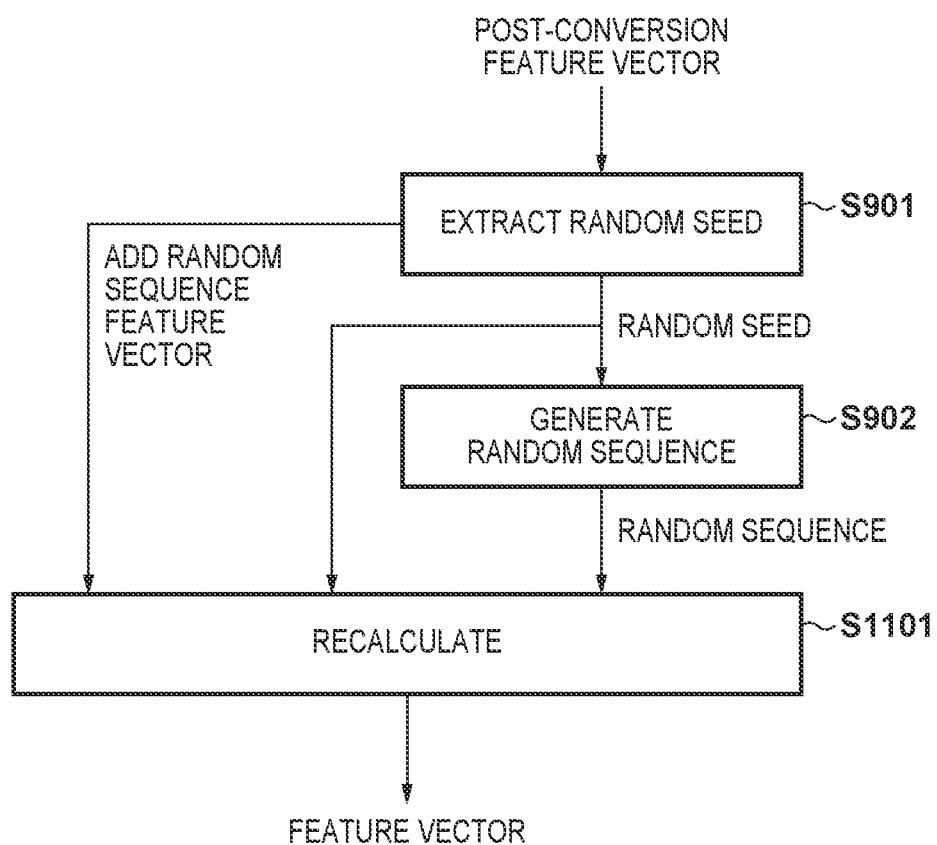
FIG. 11 is a flowchart illustrating an example of feature vector recalculation processing according to the third embodiment.

In the processing performed by the system 600 according to the present embodiment, the seed value extracted by the recalculation unit 604 and the seed value recalculated by the recalculation unit 604 based on the recalculated feature vector (by the same processing as that in step S701) should be equal. On the other hand, if these seed values are not equal, it is highly likely that the post-conversion vector that has been input to the matching processing unit 603 differs from the post-conversion feature vector calculated in the feature extracting unit 601. From such a viewpoint, the recalculation unit 604 may recalculate the seed value from the recalculated feature vector, then determine whether or not the extracted seed value and the recalculated seed value are equal, and may recalculate the feature vector only if these seed values are equal. FIG. 11 is a flowchart illustrating an example of the processing performed by the recalculation unit 604 configured to perform such processing. The processing illustrated in FIG. 11 is the same as the processing illustrated in FIG. 9 except that the processing in step S1101 is performed in place of the processing in S903, and therefore redundant descriptions have been omitted.

In step S1101, the recalculation unit 604 recalculates a feature vector in the same manner as in step S903, and recalculates a seed value based on the recalculated feature vector in the same manner as in step S701. Then, the recalculation unit 604 determines whether or not the seed value extracted in step S901 and the recalculated seed value are equal. If these seed values are equal, the recalculated feature vector is output to the identification unit 108, and if not, the processing ends, and the identification processing by the identification unit 108 is not also performed.

With such processing, whether or not to perform the identification processing based on the recalculated feature vector can be determined according to whether or not the seed value extracted from the post-conversion vector and the recalculated seed value match. Accordingly, it is possible to prevent matching processing using a post-conversion vector generated by feature extraction performed by a feature extracting unit 601 that is not originally intended. This provides the effect of further suppressing duplication of the feature extracting unit 601 through distillation.

Although r and n are described as matching in the present embodiment, r and n need not match as long as the correlation in distance between the vectors becomes weaker before and after conversion. For example, r may be smaller than n. If r and n do not match, the processing for generating the post-conversion vector in step S703 is performed by updating an element of the vector that has a larger number of elements, using the element of the other vector that is located at the corresponding position, in the same manner as in the processing for generating the post-conversion vector in step S303.

Third Embodiment

In the first and second embodiments, description has been given of an example of a face authentication system that compares two facial image regions, and determines whether or not subjects belong to the same person. A system 1000 including an information processing apparatus according to the third embodiment registers in advance face region images (referred to as registered images) of a person for which face authentication is to be performed, and determines whether a face region image that has been input is any of the registered registered images, or is not any of the registered images.

Figure 10:
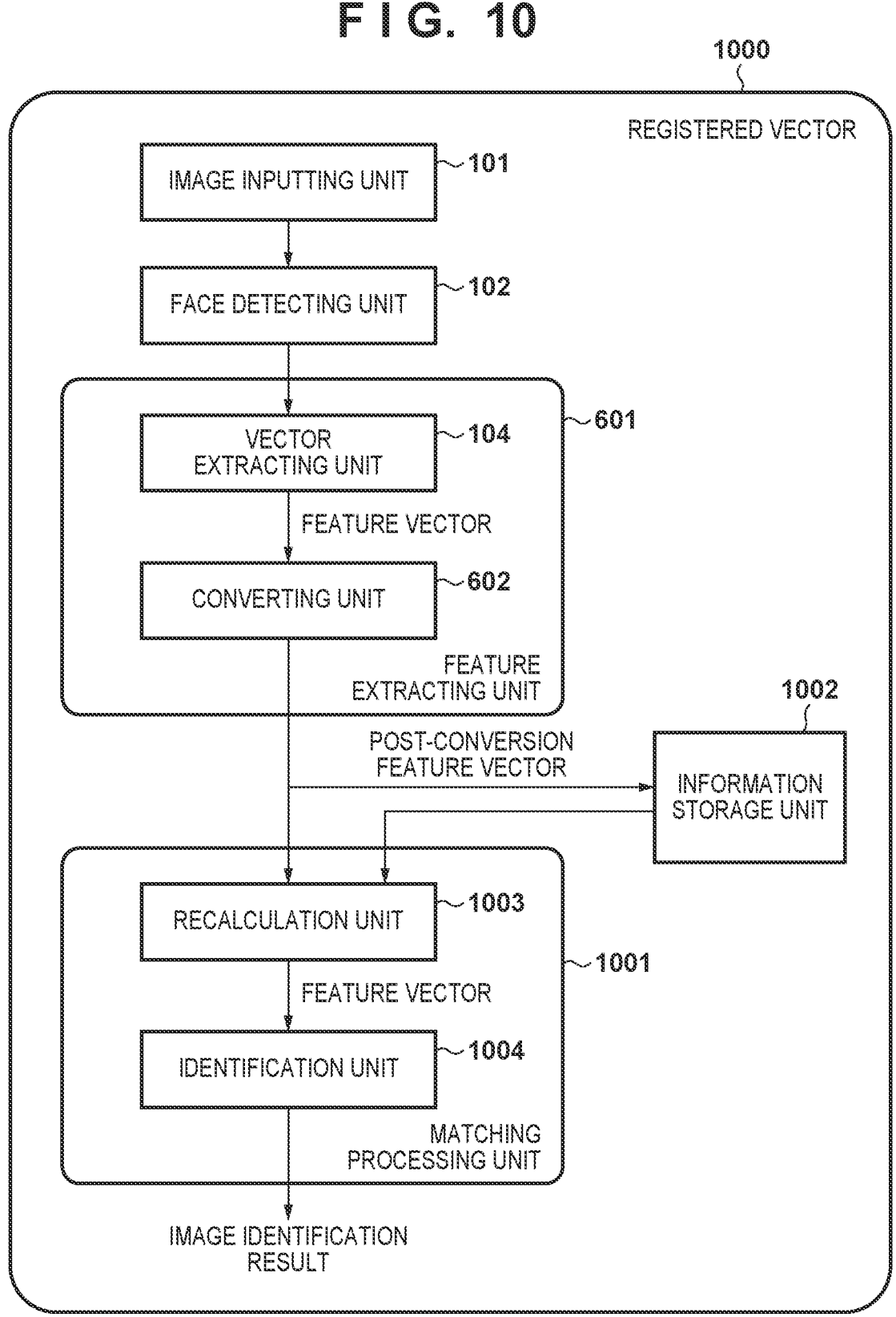
FIG. 10 is a diagram showing an example of a configuration of a system including an information processing apparatus according to a third embodiment.

FIG. 10 is a block diagram showing an example of the configuration of the system 1000 that performs face authentication, and that includes a feature extracting unit 601 of the information processing apparatus according to the present embodiment. The system 1000 has the same configuration as that of the system 600 of the second embodiment except for including a matching processing unit 1001 in place of the matching processing unit 603, and newly including an information storage unit 1002, and therefore redundant descriptions have been omitted. Although in the following description, the post-conversion vector is described as being generated by the same processing as that of the second embodiment, the post-conversion vector may be generated by the processing illustrated in FIG. 5 of the first embodiment.

The information storage unit 1002 stores a post-conversion vector that has been generated in advance, by the processing illustrated in FIG. 7, from a feature vector extracted using each registered image. The information storage unit 1002 records a post-conversion vector (hereinafter referred to as a registered vector) generated from each registered image and a person ID corresponding to the registered image in association with each other, and transmits them to the matching processing unit 1001.

The matching processing unit 1001 uses the post-conversion vector generated by the converting unit 602 and the registered vector received from the information storage unit 1002 to determine whether or not the two images belong to the same person. The matching processing unit 1001 includes a recalculation unit 1003 and an identification unit 1004.

The recalculation unit 1003 recalculates a feature vector, using, as an input, each of the post-conversion vector generated by the converting unit 602 and the registered vector received from the information storage unit 1002. This processing is performed in the same manner as the processing illustrated in FIG. 9 of the second embodiment. Note that the recalculation unit 1003 records the feature vector recalculated from the registered vector in association with the person ID associated with the registered vector.

The identification unit 1004 uses the two feature vectors recalculated by the recalculation unit 1003 to determine whether or not the facial images from which the respective feature vectors have been extracted belong to the same person. The determination processing performed by the identification unit 1004 is performed in the same manner as the processing performed by the identification unit 108 of the first embodiment.

When a plurality of registered vectors are stored in the information storage unit 1002, the determination processing of the identification unit 1004 may be performed on the post-conversion vector generated by the converting unit 602 for each of the registered vectors. In that case, if the largest similarity among the similarities calculated for the registered vectors is larger than a predetermined threshold, the identification unit 1004 determines that the person corresponding to the person ID of the registered vector having the largest similarity is the subject in the image that has been input to the image inputting unit 101. On the other hand, if any of the similarities calculated for the registered vectors does not exceed the predetermined threshold, the information storage unit 1002 outputs a notification indicating that none of the registered images corresponds to the person.

With such configuration, a face authentication system capable of preventing duplication through distillation can be used to determine whether or not a subject in an input image belongs to any of the persons whose images are registered.

Fourth Embodiment

In the above-described embodiments, for example, each of the processing units shown in FIG. 1 and so forth are implemented by dedicated hardware. All or part of the processing units of the system 100 may be implemented by a computer. In the present embodiment, at least part of the processing according to each of the above-described embodiments is executed by a computer.

Figure 12:
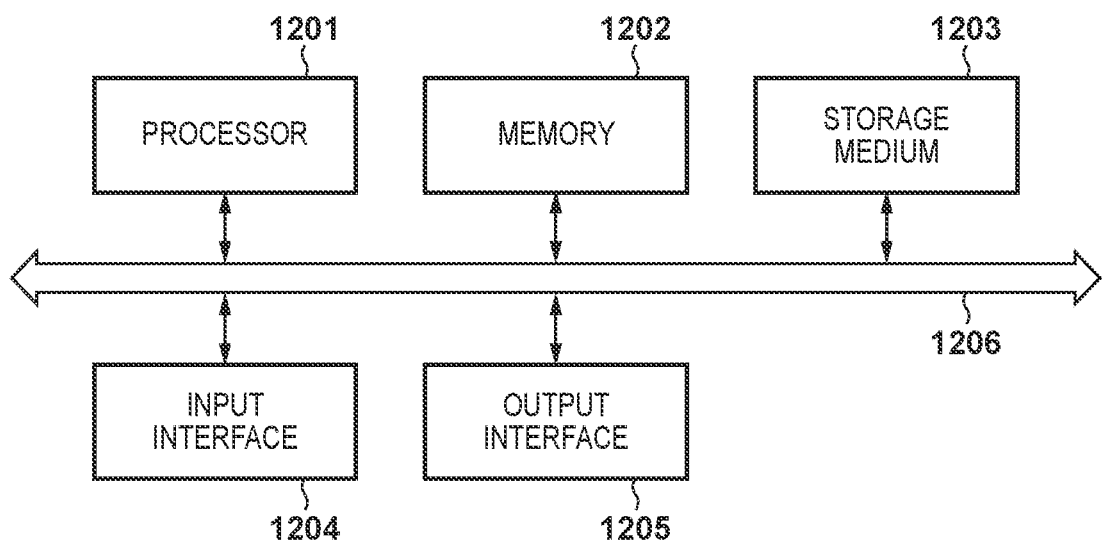
FIG. 12 is a diagram showing a hardware configuration of a computer according to a fourth embodiment.

FIG. 12 is a diagram showing a basic configuration of the computer. In FIG. 12, a processor 1201 is a CPU, for example, and performs overall control of the operations of the computer. A memory 1202 is a RAM, for example, and temporarily stores a program and a data or the like. A computer-readable storage medium 1203 is a hard disk or a CD-ROM or the like, for example, and stores a program and data or the like for a long period. In the present embodiment, a program that is stored in storage medium 1203 and that implements the functions of the units is read out to the memory 1202. Then, the functions of the units are implemented by the processor 1201 operating in accordance with the program on the memory 1202.

In FIG. 12, an input interface 1204 is an interface for obtaining information from an external apparatus. An output interface 1205 is an interface for outputting information to an external apparatus. A bus 1206 connects the above-described units, and enables data exchange therebetween.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-040692, filed Mar. 12, 2021, which is hereby incorporated by reference herein in its entirety.

What is claimed is:

1. An information processing apparatus comprising:
   at least one processor; and
   at least one memory having stored thereon instructions which, when executed by the at least one processor, cause the information processing apparatus at least to:
   extract at least one feature vector corresponding to a subject in an image;
   generate a different seed value for each feature vector of the at least one feature vector;
   generate a different random sequence for each of the seed values; and
   calculate at least one post-conversion vector by inserting each seed value into a predetermined position of a corresponding corrected vector,
   wherein each corrected vector is obtained by performing an operation on elements positionally corresponding to each other between a corresponding feature vector and a corresponding random sequence, and
   wherein the operation enables reconstruction of each feature vector of the at least one feature vector using a corresponding seed value and a corresponding post-conversion vector.

2. The information processing apparatus according to claim 1, wherein the instructions, when executed by the at least one processor, further cause the information processing apparatus at least to:
   calculate a converted vector in which a value of each of the elements is determined according to the random sequence,
   wherein the corrected vector is generated by updating a value of each of the elements of one of the at least one feature vector and the converted vector that has a larger number of elements, or a value of each of the elements of one of the at least one feature vector and the converted vector if numbers of elements of the at least one feature vector and the converted vector are equal, based on a value of a positionally corresponding element of the other of the at least one feature vector and the converted vector.

3. The information processing apparatus according to claim 2,
wherein the seed value is calculated based on the at least one feature vector.

4. An image identification system comprising:
the information processing apparatus according to claim 1;
at least one second processor; and
at least one second memory storing instructions which, when executed by the at least one second processor, causes the image identification system at least to:
perform class determination based on at least one feature vector, wherein the performing the class determination includes:
recalculating the at least one feature vector based on the post-conversion vector, and
perform class determination for the subject, using the recalculated at least one feature vector.

5. The image identification system according to claim 4, wherein the instructions, when executed by the at least one second processor, further cause the image identification system at least to:
generate, based on the at least one feature vector, a seed value used when generating the random sequence,
wherein the performing the class determination further includes:
obtaining a seed value of the random sequence based on the post-conversion vector,
wherein the class determination for the subject is performed if the obtained seed value and the generated seed value based on the recalculated at least one feature vector are identical.

6. The information processing apparatus according to claim 1,
wherein a number of elements of each post-conversion vector is determined according to the corresponding random sequence and is larger than a number of elements of the corresponding feature vector.

7. The information processing apparatus according to claim 1, wherein each random sequence has a different column length.

8. An information processing method comprising:
extracting at least one feature vector corresponding to a subject in an image;
generating a different seed value for each feature vector of the at least one feature vector;
generating a different random sequence for each of the seed values; and
calculating at least one post-conversion vector by inserting each seed value into a predetermined position of a respective corrected vector,
wherein each corrected vector is obtained by performing an operation on elements positionally corresponding to each other between a corresponding feature vector and a corresponding random sequence, and
wherein the operation enables reconstruction of each feature vector of the at least one feature vector using a corresponding seed value and a corresponding post-conversion vector.

9. A non-transitory computer readable storage medium storing a program that, when executed by a computer, causes the computer to perform an information processing method comprising:
extracting at least one feature vector corresponding to a subject in an image;
generating a different seed value for each feature vector of the at least one feature vector;
generating a different random sequence for each of the seed values; and
calculating at least one post-conversion vector by inserting each seed value into a predetermined position of a respective corrected vector,
wherein each corrected vector is obtained by performing an operation on elements positionally corresponding to each other between a corresponding feature vector and a corresponding random sequence, and
wherein the operation enables reconstruction of each feature vector of the at least one feature vector using a corresponding seed value and a corresponding post-conversion vector.

* * * * *